United States Patent
Aichriedler et al.

(10) Patent No.: US 10,704,933 B2
(45) Date of Patent: Jul. 7, 2020

(54) INTEGRATED ANGLE SENSING DEVICE

(71) Applicant: Infineon Technologies AG, Neubiberg (DE)

(72) Inventors: Leo Aichriedler, Puch (AT); Peter Slama, Klagenfurt (AT)

(73) Assignee: Infineon Technologies AG, Neubiberg (DE)

(*) Notice: Subject to any disclaimer, the term of this patent is extended or adjusted under 35 U.S.C. 154(b) by 125 days.

(21) Appl. No.: 14/474,638

(22) Filed: Sep. 2, 2014

(65) Prior Publication Data

US 2016/0061637 A1     Mar. 3, 2016

(51) Int. Cl.
| | | |
|---|---|---|
| G01D 11/24 | (2006.01) | |
| G01D 5/12 | (2006.01) | |
| G01D 5/14 | (2006.01) | |
| G01P 3/487 | (2006.01) | |

(52) U.S. Cl.
CPC ............ *G01D 11/24* (2013.01); *G01D 5/12* (2013.01); *G01D 5/145* (2013.01); *G01P 3/487* (2013.01)

(58) Field of Classification Search
CPC .......... G01D 11/24; G01D 5/12; G01D 5/145
See application file for complete search history.

(56) References Cited

U.S. PATENT DOCUMENTS

| | | | |
|---|---|---|---|
| 5,252,919 A | 10/1993 | Uemura | |
| 6,235,121 B1 * | 5/2001 | Honma | ............ C23C 16/4401 118/715 |
| 6,326,781 B1 * | 12/2001 | Kunde | .................. G01D 5/145 324/144 |
| 6,489,761 B1 | 12/2002 | Schroeder et al. | |
| 6,873,151 B2 | 3/2005 | Lequesne et al. | |
| 2001/0015642 A1 * | 8/2001 | Fischer | .................. G01D 5/145 324/207.2 |
| 2002/0011837 A1 * | 1/2002 | Sato | ....................... G01D 5/145 324/207.2 |
| 2002/0135497 A1 * | 9/2002 | Kimura | ................. G01D 5/145 340/870.31 |
| 2005/0236219 A1 * | 10/2005 | Saito | ....................... F16H 59/70 180/433 |
| 2007/0103149 A1 | 5/2007 | Horie et al. | |
| 2008/0164867 A1 | 7/2008 | Steinich et al. | |

(Continued)

FOREIGN PATENT DOCUMENTS

| | | |
|---|---|---|
| CA | 1232957 A | 2/1988 |
| DE | 102006033525 A1 | 2/2007 |

(Continued)

OTHER PUBLICATIONS

International Search Report, PCT/EP2015/070053, Infineon Technologies AG, dated Nov. 17, 2015.

(Continued)

*Primary Examiner* — Christopher P McAndrew
*Assistant Examiner* — Zannatul Ferdous
(74) *Attorney, Agent, or Firm* — Harrity & Harrity, LLP

(57) ABSTRACT

A sensor arrangement includes a sensor element and a magnet module. The sensor element is configured to measure a magnetic field and is positioned within a shaft. The shaft is configured to shield the magnet module and the sensor element. The magnet module is configured to generate the magnetic field. The sensor element is at least partially positioned within the shaft.

21 Claims, 8 Drawing Sheets

(56) References Cited

U.S. PATENT DOCUMENTS

| | | | |
|---|---|---|---|
| 2009/0072816 A1* | 3/2009 | Schrubbe | G01D 5/06 |
| | | | 324/207.2 |
| 2009/0322325 A1 | 12/2009 | Ausserlechner et al. | |
| 2011/0095658 A1* | 4/2011 | Takeuchi | G01D 5/2458 |
| | | | 310/68 B |
| 2011/0168466 A1* | 7/2011 | Starr | B60K 7/0007 |
| | | | 180/65.51 |
| 2012/0038348 A1* | 2/2012 | Aimuta | G01D 3/02 |
| | | | 324/207.24 |
| 2016/0033305 A1* | 2/2016 | Mehnert | G01D 5/2216 |
| | | | 324/207.18 |
| 2017/0284836 A1 | 10/2017 | Aichriedler et al. | |

FOREIGN PATENT DOCUMENTS

| | | |
|---|---|---|
| EP | 0478143 A1 | 4/1992 |
| EP | 1083407 A2 | 3/2001 |
| EP | 1128159 A2 | 8/2001 |

OTHER PUBLICATIONS

Extended European Search Report for Application No. EP19178737.3, dated Sep. 16, 2019, 7 pages.

* cited by examiner

INTEGRATED ANGLE SENSING DEVICE

BACKGROUND

Sensors are utilized in sensing systems to detect properties, such as light, temperature, motion, and the like. One type of sensor commonly used is an angle sensor based on magnetic fields. The angle sensor measures a magnetic field direction and calculates an angle based on the field direction. Other magneto-sensitive sensors measure the magnetic flux density.

However, such magnetic based sensors are susceptible to disturbances in the magnetic field. Many systems operate in harsh environments, such as automotive systems, and have components that can disturb the magnetic field and result in faulty sensor measurements.

What are needed are techniques to mitigate or prevent disturbances to enhance magnetic sensor operation, accuracy and robustness against positioning tolerances.

DETAILED DESCRIPTION

Figure 1:
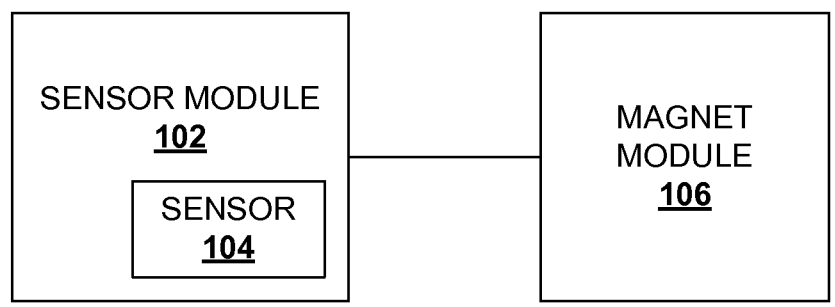
FIG. 1 is a diagram of an integrated sensor system that operates using magnetic fields.
Figure 1:

The present invention will now be described with reference to the attached drawing figures, wherein like reference numerals are used to refer to like elements throughout, and wherein the illustrated structures and devices are not necessarily drawn to scale.

Devices, systems and methods are disclosed that facilitate angle sensors and mitigate disturbances in magnetic fields. Harsh environments, such as automotive systems, have a variety of components and conditions that impact electronics, sensors, and magnetic fields. These disturbances can result in faulty measurements, sensor failures, and require precise position tolerances.

FIG. 1 is a diagram of an integrated sensor system 100 that operates using magnetic fields. The system 100 is provided in a simplified form in order to facilitate understanding. The system 100 can be utilized in harsh environments, automotive systems, vehicle systems, and the like. The system 100 can be fabricated into one or more devices or arrangements.

Hybrid systems, such as automotive systems, have mechanical components and electrical components. The mechanical components include engines, motors, wheels, fluids, brake systems, actuators and the like. The electrical components include sensors, processing units, control units and the like. The mechanical components can create disturbances for the electrical components. These disturbances include power surges, power loss, power traces, high power traces, vibration, debris, metal flakes/pieces, fluid contamination, transmission fluid contamination (very aggressive), break cleaner, coolant, material, dirt and the like. The more motors, actuators, and other components, the more current and fluctuations are present.

Other approaches are susceptible to disturbances and fail to provide mechanisms to mitigate against these disturbances. One approach is to add a sensor to an end of a shaft and encapsulate the sensor. However, encapsulation adds cost and additional processing and requires additional space. Additionally, such approaches also include placing a sensor element at an end of a shaft. This increases the overall length of the shaft or attached to component, which requires extra vehicle/engine space. Additional mounts, connectors, and the like are required to mount the sensor to the end of the shaft. These can further increase the length/space consumed and require even more vehicle/engine space.

The system 100 includes a sensor module 102, a sensor element 104, and a magnet module 106. The system 100 integrates the sensor module 102 with a case, shaft or other component to provide self shielding. Additionally, by being integrated, the system 100 consumes less space than other approaches. Further, the system 100 utilizes the self shielding to permit components having lower capabilities while providing suitable or selected accuracy.

The sensor module 102 is an integrated component in that is integrated with a case or other component. The sensor module 102 includes the integrated sensor element 104. The module 102 can also include power regulation components, signal generation components, memory components and the like. Although not shown, other components including mounts, fasteners, connections, housing, and the like can be included. In one example, the sensor module 102 is formed on a die having a leadframe. The sensor module 102 is enclosed in a housing using over molded plastic. Connectors to the leadframe are provided and provide external connections to the sensor module 102. The sensor module can be coupled to or incorporated into components, such as a case, lever, arm, axle leg, and the like.

The sensor element 104 measures a magnetic field or flux of a magnetic field. The element 104 or another component then calculates a characteristic, such as angle or shaft position, based on the field measurement. The sensor element 104 is configured to receive supply power, provide measurements, and/or receive control or calibration information. In one example, a single interface is used for supply power and transferring measurements. In another example, multiple wires or ports are used for power and/or communication.

The sensor element 104 is an absolute or 360 degree type sensor, meaning that it can measure flux at any angle or rotation. It is of a suitable type, such as magneto-resistive or magneto-sensitive types of elements.

The magnet module 106 is affixed or attached to or integrated with a component to be measured and is configured to generate a magnetic field proximate the sensor element 104. The magnet module 106 is diametrically magnetized, in one example. The magnet module 106 can include magnets of a variety of sizes and shapes. Some example shapes include pill or solid magnets, ring magnets, and the like. The sizes are selected to provide a suitable magnetic field. Typically, the sizes include a thickness and a diameter.

Disturbances, such as those shown above, can disturb a magnetic field which is being measured by the sensor element 104. However, the sensor module 102 is integrated with a component to shield the module 102 and the element 104, without requiring extensive encapsulation or other mechanisms to mitigate the disturbances. The component providing the shielding for the sensor element 104 and the magnet module 106 includes, for example, a rotatable object, such as a shaft, rod, and the like, comprised of a suitable material. In one example the suitable material includes a relatively soft magnetic material having a permeability of greater than 1.

Figure 2:
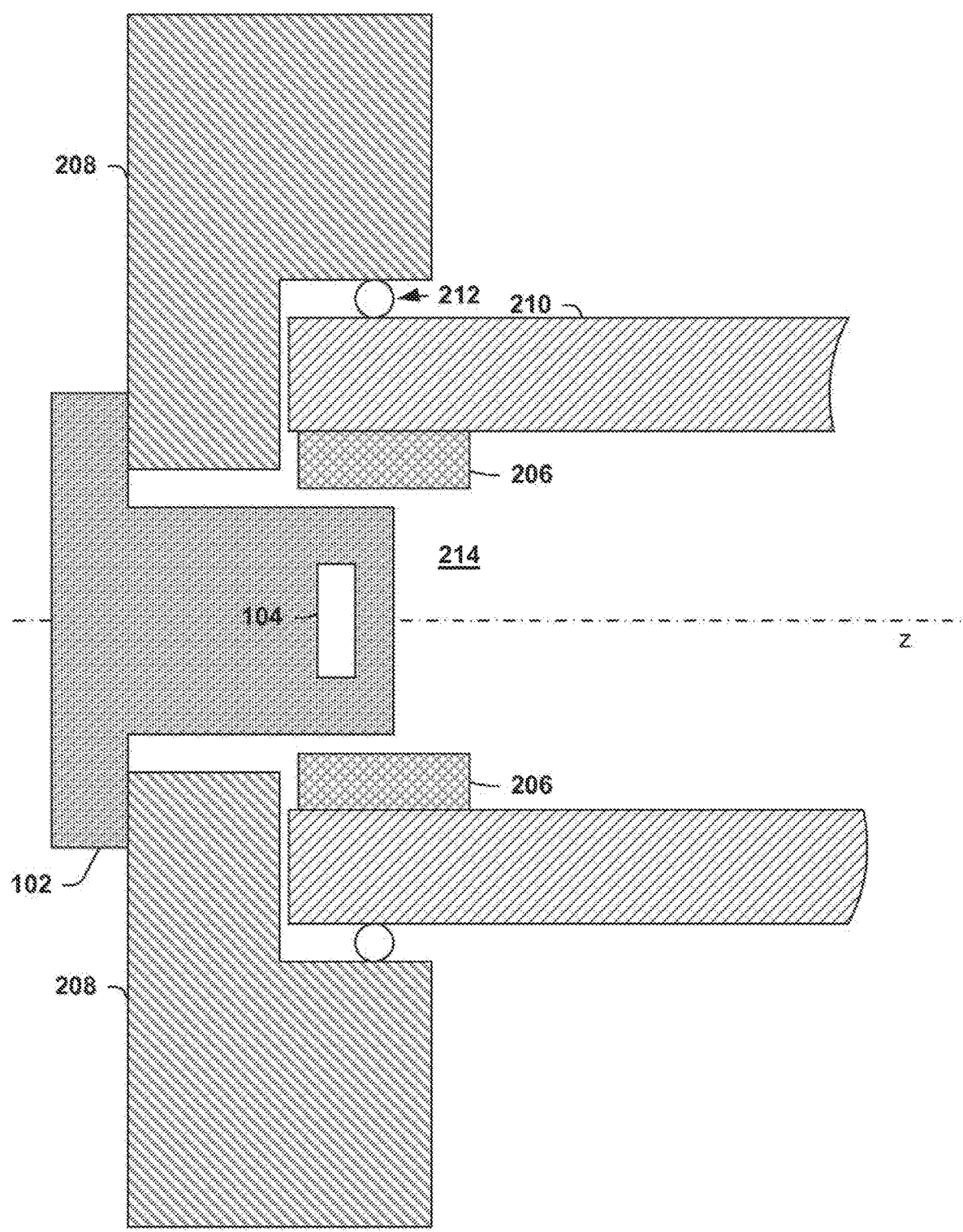
FIG. 2 is a cross sectional diagram of an integrated sensor system having a hollow shaft and a ring shaped magnet module.

FIG. 2 is a cross sectional diagram of an integrated sensor system 200 having a hollow shaft and a ring shaped magnet module. The system 200 is provided in a simplified form in order to facilitate understanding. The system 200 can be utilized in harsh environments, automotive systems, vehicle systems, and the like. The system 200 can be fabricated into one or more devices. Additional details for some of the component can be referenced from the above description of similarly numbered components.

The system 200 includes a case 208, a sensor module 102, a sensor element 104, a magnet module 206, and a shaft 210. The system 200 integrates the sensor module 102 with the shaft 210, which shields the sensor module 102 and the magnet module 206 from disturbances and enforces magnetic fields generated by the magnet module 206.

The sensor module 102 includes the sensor element 104 formed within a housing. The housing is an over molded plastic. The sensor element 104 is configured with a leadframe. The module 102 includes connections from the leadframe of the sensor element 104 to ports or external connections.

The case 208 can be part of a transmission box, compartment, powertrain combustion engine, and the like. The case 208 is configured to receive and support the shaft 210. The case 208 includes a hollowed out recess into which the shaft 210 is inserted. Bearings 212 or another component/device are configured to facilitate rotation of the shaft 210 without excess friction. The case 208 also includes a module opening where the sensor module 102 is inserted or positioned. It is noted that the sensor module 102 is removable from the case 208. In another example, the sensor module is non-removable attached to the case 208. In one example, the case 208 provides a hermetic seal that protects the sensor module from debris and contaminants. Additionally, the case 208 can be configured to provide magnetic and/or electrical shielding.

The shaft 210 is separate from the case 208. A first end of the shaft is attached to a motor or other rotatable object and a second end is proximate the case 208. The second end of the shaft 210 can be coupled to bearings to facilitate rotation. The shaft 210 can be part of an automotive system, such as a power train, transmission system, and the like. The shaft 210 is generally a long cylindrical rod comprised of a suitable material, such as a metal, soft magnetic material, and the like. Some examples of a suitable metal include steel and aluminum. An example of a soft magnetic material includes a material having a magnetic permeability of greater than 1. The shaft 210 rotates at a range of rotations per minute (RPM) and in a rotational direction, clockwise or counter clockwise. The RPM can include low RPM ranges, such as 0 to 200 RPM and high RPM ranges, such as those exceeding 4,000 RPM.

The shaft 210 is shown having an axis of rotation shown as z. The shaft 210 rotates about the axis of rotation with a rotational direction.

The shaft 210 can be hollowed out, solid, or otherwise configured. In FIG. 2, the shaft 210 is hollowed and has a selected wall thickness. At least a portion of the sensor module 102 and the sensor element 104 extends partially into the open portion of the shaft 210 at the second end. Additionally, the magnet module 206 is located at least partially within the open portion of the shaft as well. By being hollowed, the shaft can be of a lower cost and weight as compared with solid shafts.

The magnet module 206 generates a magnetic field having flux and configured for measurement. In this example, the magnet module 206 includes a ring shaped magnet positioned about an inner surface of the shaft 210. The ring shaped magnet partially surrounds the sensor module 102 and surrounds the sensor element 104.

The sensor module 102 is integrated into the case 208, in this example. The sensor module 102 can include an O-ring or similar material to seal between the sensor module 102 and the case 208. The sensor element is positioned proximate at a second end of the module 102. The sensor element 104 measures the magnetic field generated by the magnet module 206.

The measurements obtained by the sensor element 104 are used to calculate angular measurements including radial position of the shaft, angular position of the shaft, rotations per minute (RPM), direction of rotation and the like.

A control unit, such as an electronic control unit (ECU) can receive the measurements and or angular information from the sensor module 102.

Figure 3:
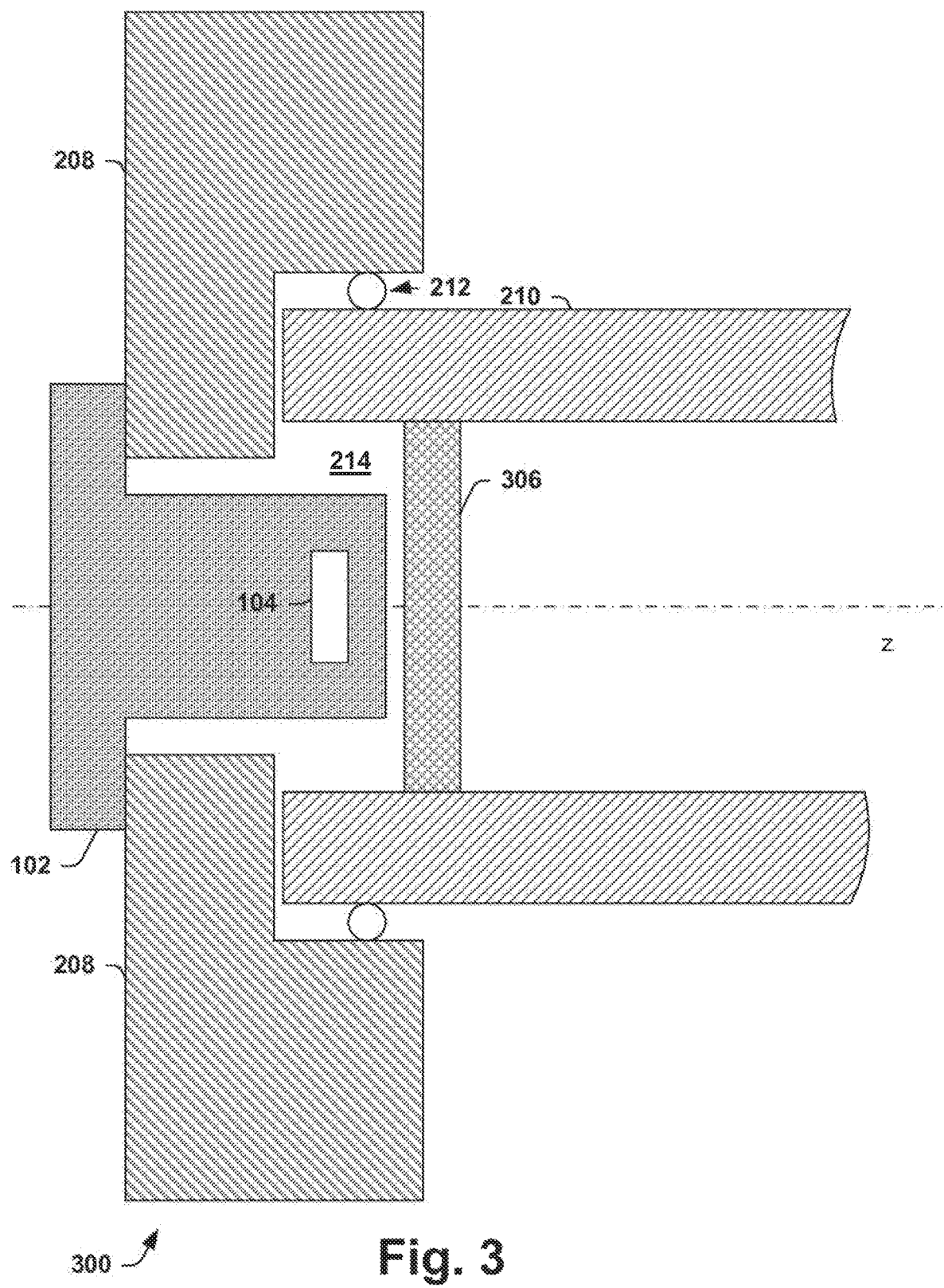
FIG. 3 is a cross sectional diagram of an integrated sensor system having a hollow shaft and a pill shaped magnet.

FIG. 3 is a cross sectional diagram of an integrated sensor system 300 having a hollow shaft and a pill shaped magnet. The system 300 is provided in a simplified form in order to facilitate understanding. The system 300 can be utilized in harsh environments, automotive systems, vehicle systems, and the like. The system 300 can be fabricated into one or more devices. The system 300 is similar to the system 200, described above, but utilizes a pill or round shaped magnet instead of a ring shaped magnet. Additional details for some of the component can be referenced from the above description of similarly numbered components.

The system 300 includes a case 208, a sensor module 102, a sensor element 104, a magnet module 306, and a shaft 210. The system 300 integrates the sensor module 102 with the shaft 210, which electrically, mechanically, and or magnetically shields the sensor module 102 from disturbances.

The sensor module 102 includes the sensor element 104 formed within a housing. The housing is an over molded plastic. The sensor element 104 is configured with a leadframe. The module 102 includes connections from the leadframe of the sensor element 104 to ports or external connections.

The case 208 can be part of a power train, transmission system, and the like. The case 208 is configured to receive and support the shaft 210. The case 208 includes a hollowed out recess, referred to as a case recess, into which the shaft 210 is inserted. Bearings 212 or another component/device are configured to facilitate rotation of the shaft 210 without excess friction.

The shaft 210 is separate from the case 208. A first end of the shaft is attached to a motor or other rotatable object and a second end is proximate the case 208. The shaft 210 is generally a long cylindrical rod comprised of a suitable material, such as described above. The shaft 210 rotates at a range of rotations per minute (RPM) and in a rotational direction, clockwise or counter clockwise. The RPM can include low RPM ranges, such as 0 to 200 RPM and high RPM ranges, such as those exceeding 4,000 RPM.

The shaft 210 can be hollowed out, solid, or otherwise configured. In FIG. 3, the shaft 210 is again hollowed and has a selected wall thickness. A portion of the sensor module 102 extends partially into the open portion of the shaft 210 at the second end. The magnet module 306 is located within the open portion of the shaft.

The magnet module 306 generates a magnetic field having flux and configured for measurement. The shaft 210 enforces the generated magnetic field. In this example, the magnet module 306 includes a pill or round shaped magnet positioned across the opening in the shaft 210. The pill shaped magnet is positioned along the same axis as the sensor module 102 and the sensor element 104. Furthermore, the pill shaped magnet has a diameter and thickness selected to provide a suitable magnetic field. The diameter can be less than a diameter of the inner surface of the shaft 210.

The sensor module 102 is integrated into the case 208, as described above. The sensor module 102 can include an O-ring or similar material to seal between the sensor module 102 and the case 208. The sensor element is positioned proximate to a second end of the module 102. The sensor element 104 measures the magnetic field generated by the magnet module 306.

The measurements obtained by the sensor element 104 are used to calculate radial position of the shaft, rotations per minute (RPM), direction of rotation and the like.

A control unit, such as an electronic control unit (ECU) can receive the measurements and or angular information from the sensor module 102.

Figure 4:
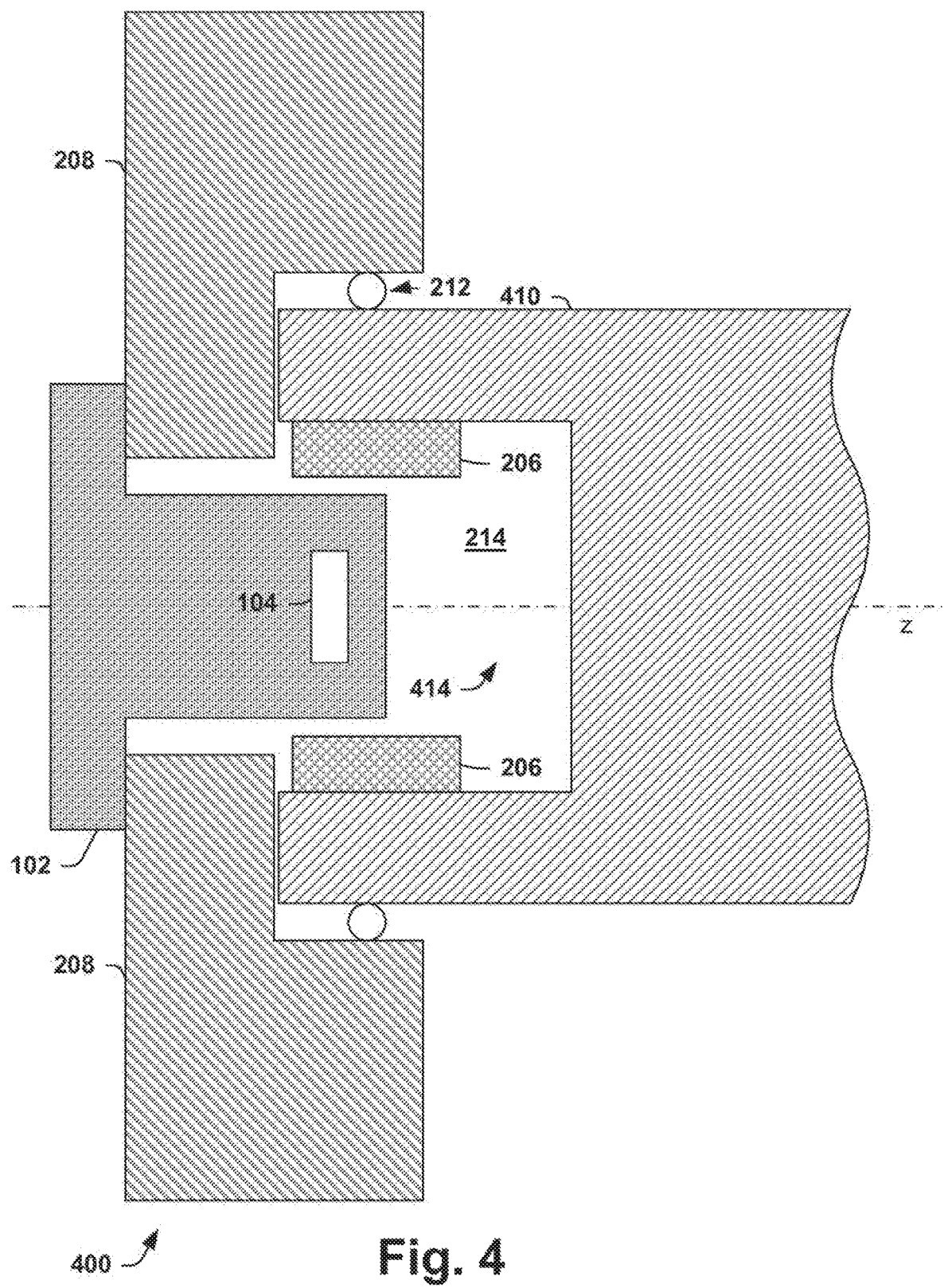
FIG. 4 is a cross sectional diagram of an integrated sensor system having a solid shaft and a ring shaped magnet module.

FIG. 4 is a cross sectional diagram of an integrated sensor system 400 having a solid shaft and a ring shaped magnet module. The system 400 is provided in a simplified form in order to facilitate understanding. The system 400 can be utilized in harsh environments, automotive systems, vehicle systems, and the like. Additionally, the system 400 can be fabricated into one or more devices. Additional details for some of the component can be referenced from the above description of similarly numbered components.

The system 400 includes a case 208, a sensor module 102, a sensor element 104, a magnet module 206, and a shaft 410. The system 200 integrates the sensor module 102 with the shaft 410, which electrically, mechanically, and or magnetically shields the sensor module 102 from disturbances.

The sensor module 102 again includes the sensor element 104 formed within a housing. The housing, in one example, is an over molded plastic. The sensor element 104 is configured with a leadframe. The module 102 includes connections from the leadframe of the sensor element 104 to ports or external connections.

The case 208 can be part of a power train, transmission system, and the like. The case 208 is configured to receive and support the shaft 410. The case 208 includes a hollowed out recess into which the shaft 410 is inserted. Bearings 212 or another component/device are configured to facilitate rotation of the shaft 410 without excess friction.

The shaft 410 is separate from the case 208. A first end of the shaft is attached to a motor or other rotatable object and a second end is proximate the case 208. The shaft 410 is generally a long cylindrical rod comprised of a suitable material, such as a metal. Some examples of a suitable metal are shown above. The shaft 410 rotates at a range of rotations per minute (RPM) and in a rotational direction, clockwise or counter clockwise. The RPM can include low RPM ranges, such as 0 to 200 RPM and high RPM ranges, such as those exceeding 4,000 RPM.

The shaft 410, in this example, is solid and has a selected diameter. The second end of the shaft 410 includes a shaft cavity 414. The cavity 414 is formed within the second end using a suitable mechanism, such as drilling. The cavity 414 has a diameter and a depth. A portion of the sensor module 102 extends partially into the shaft cavity 414. Additionally, the magnet module 206 is located within the shaft cavity. The shaft 410, by being solid, can have superior strength as compared with hollowed shafts.

The magnet module 206 generates a magnetic field having flux and configured for measurement. In this example, the magnet module 206 includes a ring shaped magnet positioned about an inner surface of the shaft cavity 414. The ring shaped magnet partially surrounds the sensor module 102 and surrounds the sensor element 104. The ring shaped magnet typically provides a better field for measuring with regards to axial displacement than a pill shaped magnet.

The sensor module 102 is integrated into the case 208, in this example. The sensor module 102 can include an O-ring or similar material to seal between the sensor module 102 and the case 208. The sensor element is positioned proximate at a second end of the module 102. The sensor element 104 measures the magnetic field generated by the magnet module 206.

The measurements obtained by the sensor element 104 are used to calculate radial position of the shaft, rotations per minute (RPM), direction of rotation and the like. A control unit (not shown), such as an electronic control unit (ECU) can receive the measurements and or angular information from the sensor module 102.

Figure 5:
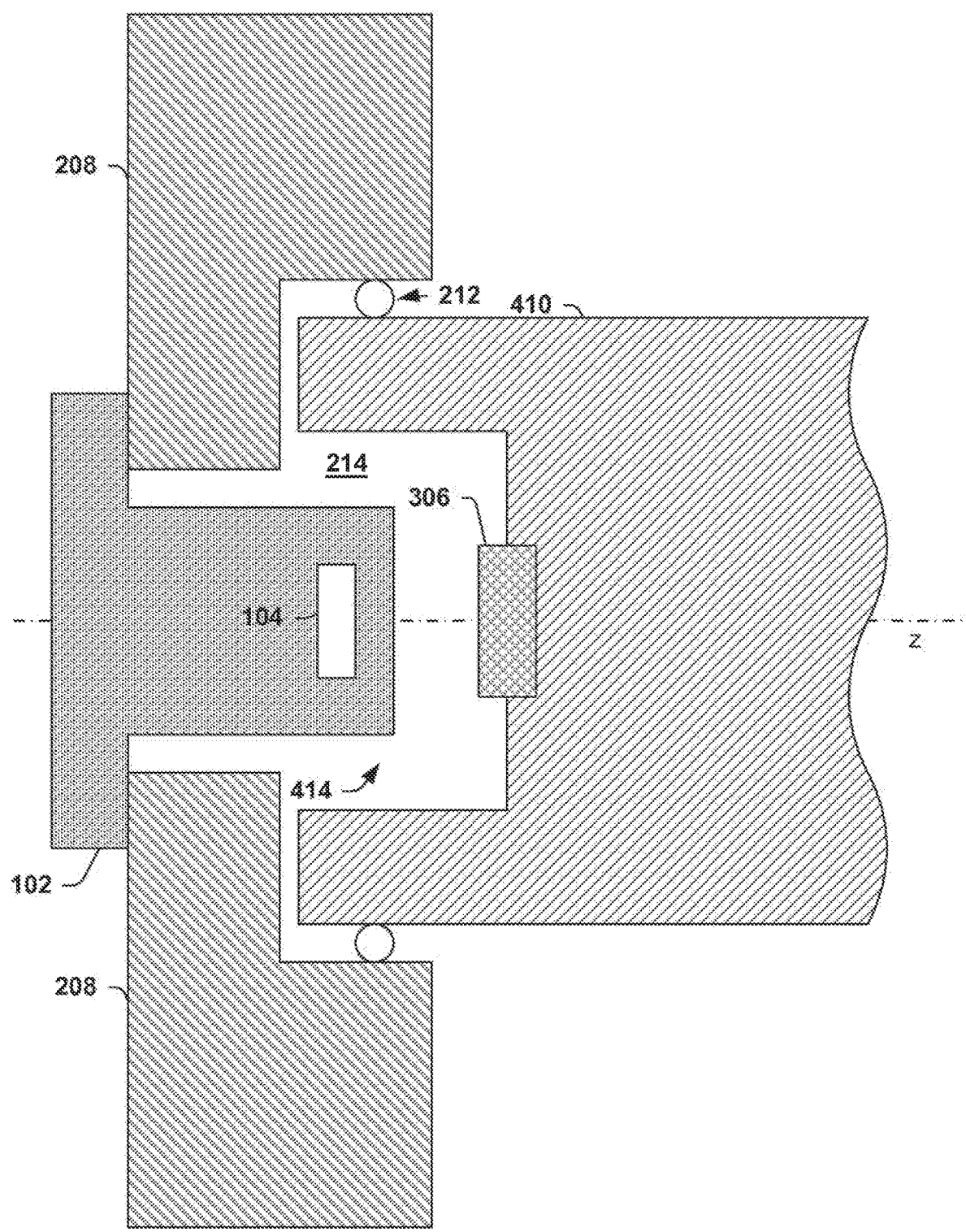
FIG. 5 is a cross sectional diagram of an integrated sensor system having a solid shaft and a pill shaped magnet.

FIG. 5 is a cross sectional diagram of an integrated sensor system 500 having a solid shaft and a pill shaped magnet. The system 500 is provided in a simplified form in order to facilitate understanding. The system 500 can be utilized in harsh environments, automotive systems, vehicle systems, and the like. Additionally, the system 500 can be fabricated into one or more devices. Additional details for some of the component can be referenced from the above description of similarly numbered components.

The system 500 includes a case 208, a sensor module 102, a sensor element 104, a magnet module 306, and a shaft 410. The system 200 integrates the sensor module 102 and the magnet module 306 with the shaft 410, which electrically, mechanically, and or magnetically shields the sensor module 102 from disturbances.

The sensor module 102 includes the sensor element 104 formed within a housing. The housing is an over molded plastic. The sensor element 104 is configured with a leadframe. The module 102 includes connections from the leadframe of the sensor element 104 to ports or external connections.

The case 208 can be part of a powertrain, transmission system and the like. The case 208 is configured to receive and support the shaft 410. The case 208 includes a hollowed out recess into which the shaft 410 is inserted. Bearings 212 or another component/device are configured to facilitate rotation of the shaft 410 without excess friction.

The shaft 410 is separate from the case 208. A first end of the shaft is attached to a motor or other rotatable object and a second end is proximate the case 208. The shaft 410 is generally a long cylindrical rod comprised of a suitable material, such as shown above. The shaft 410 rotates at a range of rotations per minute (RPM) and in a rotational direction, clockwise or counter clockwise. The RPM can include low RPM ranges and high RPM ranges and variations thereof.

The shaft 410 is solid and has a selected diameter. The second end of the shaft 410 includes a shaft cavity 414. The cavity 414 is formed within the second end using a suitable mechanism. The cavity 414 has a diameter and a depth. A portion of the sensor module 102 extends partially into the shaft cavity 414. Additionally, the magnet module 306 is located within the shaft cavity.

The magnet module 306 generates a magnetic field having flux and configured for measurement. In this example, the magnet module 306 includes a pill shaped magnet positioned in the shaft cavity 414. The pill shaped magnet is positioned on an axis with the sensor 104. Further, the pill shaped magnet has a diameter and thickness, as described above in regards to FIG. 3.

The sensor module 102 is integrated into the case 208 and the shaft 410, in this example. The sensor module 102 can include an O-ring or similar material to seal between the sensor module 102 and the case 208. The sensor element is positioned proximate at a second end of the module 102. The sensor element 104 measures the magnetic field generated by the magnet module 206.

The measurements obtained by the sensor element 104 are used to calculate radial position of the shaft, rotations per minute (RPM), direction of rotation and the like. A control unit (not shown), such as an electronic control unit (ECU) can receive the measurements and or angular information from the sensor module 102. The measurements or information include analog or digital raw data, calculated angle information, and the like.

Figure 6:
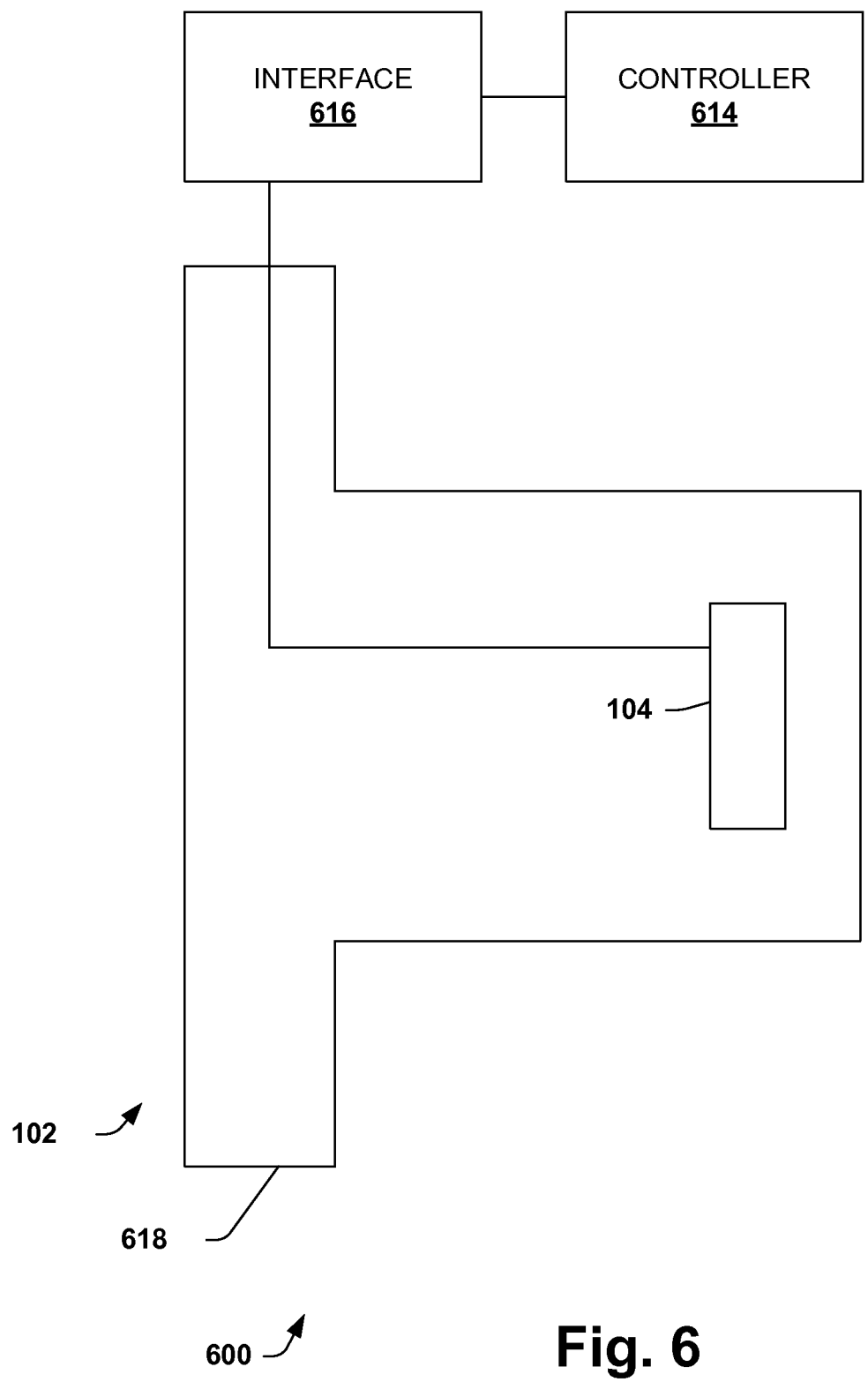
FIG. 6 is a diagram depicting a sensor module system.

FIG. 6 is a diagram depicting a sensor module system 600. The system 600 can be used with the above systems and devices and is provided to facilitate understanding.

The system 600 includes a sensor module 102, an interface 616, and a controller or control unit 614. The sensor module 102 includes a sensor element 104. The sensor element 104 is a magneto sensitive technology, such as magneto resistive, Hall effect, and the like. The sensor element 104 is configured to measure a magnetic field, magnetic flux density, magnetic field direction, and the like proximate the element 104. The sensor element 104 is formed on a die and has a leadframe for power and providing measurements.

The sensor module 102 includes a housing 618 formed of a suitable material, such as over molded plastic. The housing 618 generally seals the sensor element 104 from debris and other disturbances.

The interface 616 is connected to the sensor element 104. The interface 616 can include one or more wires/connections to the sensor element 104 and external to the housing 618. The interface 616 is configured to transfer measurements from the sensor element 104 and supply power to the sensor element 104.

The controller 614 is connected to the interface 616 and is configured to control the sensor element 104 and receive magnetic field/flux measurements from the sensor element 104. The controller 614 determines angular information about a component, such as angle position, radial position, rotational speed, acceleration, and the like. The component is generally a rotatable component, such as a motor shaft, wheel, powertrain shaft, transmission shaft, and the like, from the sensor measurements. In particular, the controller 614 is configured to determine angular position, angular direction, RPM, and the like.

Figure 7:
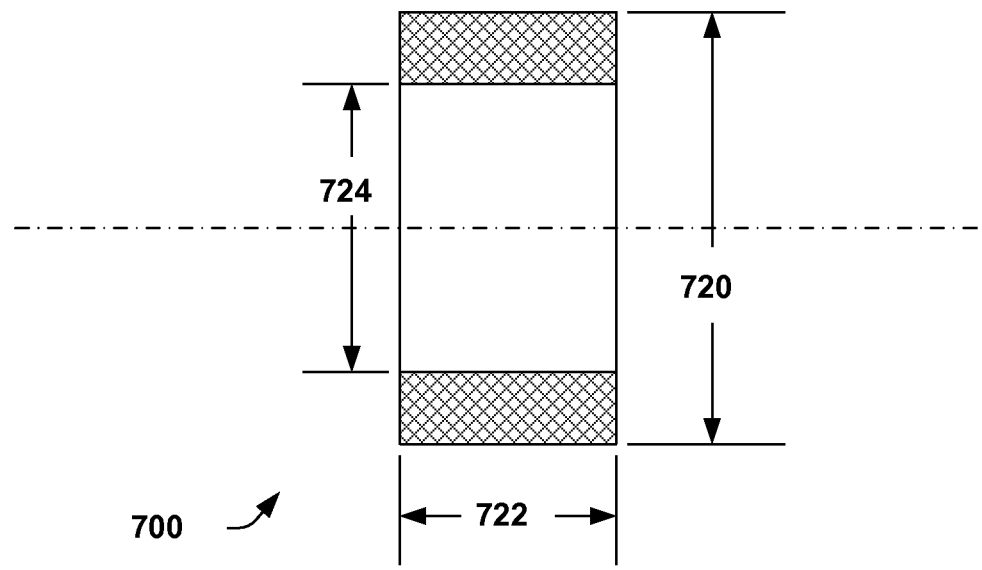
FIG. 7 is a ring shaped magnet that can be utilized in a magnet module, such as the magnet modules described above.

FIG. 7 is a ring shaped magnet 700 that can be utilized in a magnet module, such as the magnet modules described above. The ring shaped magnet 700 can be utilized in the above systems to generate a magnetic field for measuring angular information, including position and RPM.

The magnet 700 is positioned within an end of a shaft for a motor, wheel, and the like. The magnet generates a suitable field determined by its composition and dimensions.

The dimensions include an outer diameter 720, a width thickness 722, and an inner diameter 724. The difference between the inner diameter 724 and the outer diameter defines a ring thickness. Generally, the larger the width thickness and the ring thickness, the larger the generated magnetic field and the more tolerant the sensor element can be. Additionally, the larger the width thickness and the ring thickness, the more tolerant against displacements of the sensor relative to the magnet, also referred to as positioning tolerances.

Figure 8:
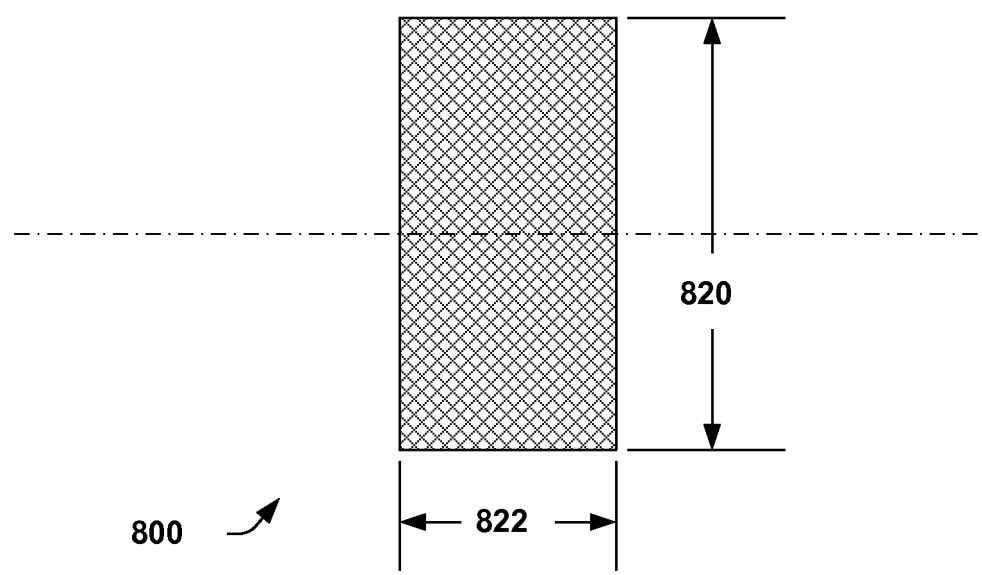
FIG. 8 is a pill or round shaped magnet that can be utilized in a magnet module, such as the magnet modules described above.

FIG. 8 is a pill or round shaped magnet 800 that can be utilized in a magnet module, such as the magnet modules described above. The pill shaped magnet 800 can be utilized in the above systems to generate a magnetic field for measuring angular information, including position and RPM.

The magnet 800 is positioned within an end of a shaft for a motor, wheel, and the like. The magnet 800 generates a suitable field determined by its composition and dimensions.

The dimensions include a diameter 820 and a thickness 822. Generally, the larger the diameter 820 and the larger the thickness 822, the larger the generated magnetic field and the more tolerant the sensor element can be.

Figure 9:
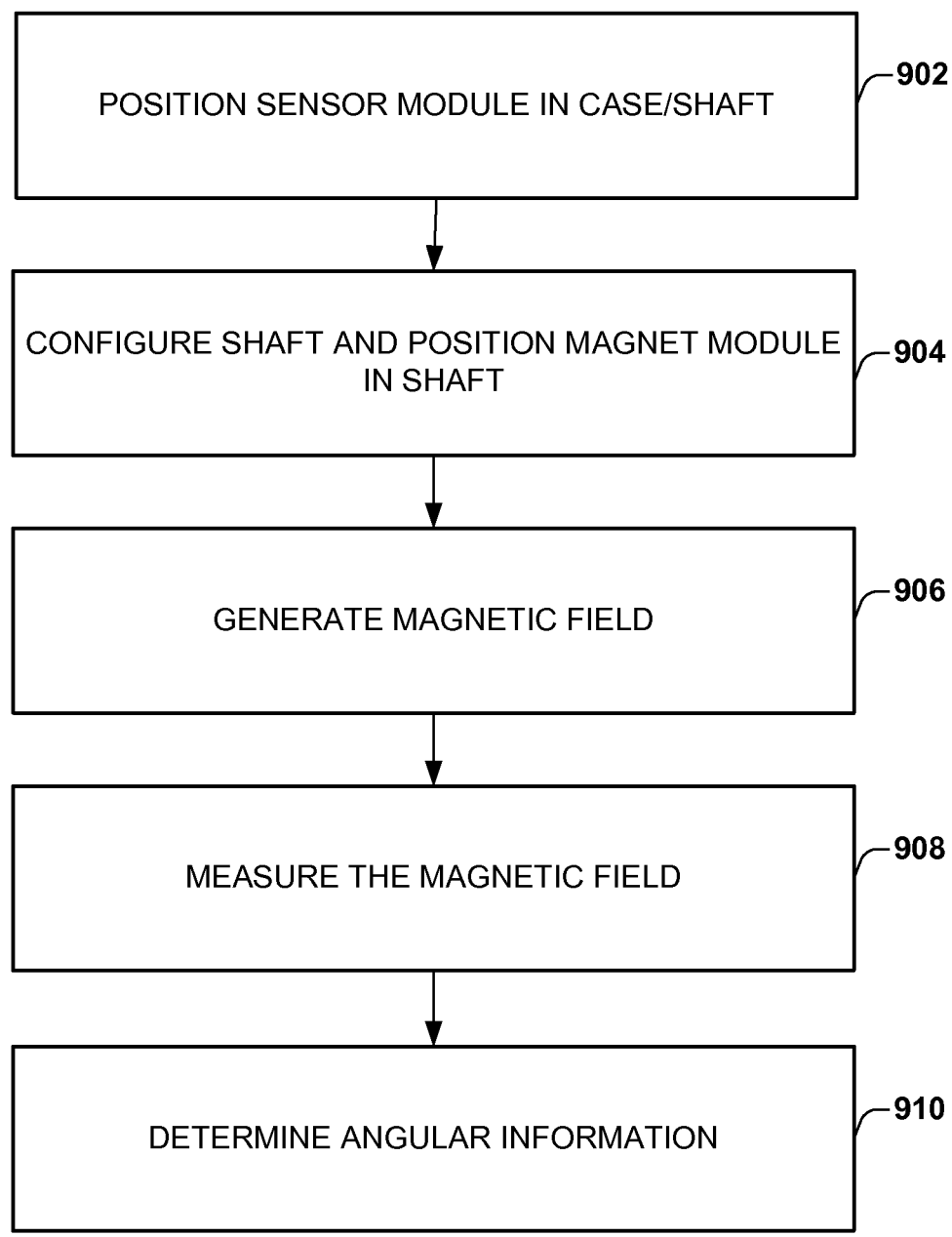
FIG. 9 is a flow diagram illustrating a method of operating a sensor device.

FIG. 9 is a flow diagram illustrating a method 900 of operating a sensor device. The method 900 inserts or integrates a sensor module into a shaft in order to provide shielding against disturbances and enforce generation of a magnetic field. The method 900 can be used in conjunction with the above systems, devices and variations thereof.

The method 900 begins at block 902, wherein a sensor module is configured or positioned into a shaft and a case. The shaft provides shielding to the sensor module so that disturbances, such as those described above, are mitigated or avoided. The case can be a housing or wall of a compartment, such as an automotive transmission component, and the like. The sensor module is overmolded and is typically removable from the case. The sensor module includes a sensor element (magnetosensitive) configured to measure magnetic fields in one, two or three axis (1D, 2D, 3D).

A shaft is configured to have a shaft recess 214 and a magnet module is positioned within the shaft recess 214 at block 904. The shaft recess 214 can be formed in a solid or hollowed shaft by drilling or another suitable mechanism. The magnet module includes a magnet, such as a ring shaped magnet or a pill shaped magnet.

A magnetic field is generated by the magnet module at block 906. The magnetic field rotates with the shaft as the shaft is rotated. The magnet module is substantially shielded from disturbances by the shaft and, as a result, the magnetic field is generated without the disturbances.

The magnetic field is measured by the sensor module at block 908. The sensor module is shielded by the shaft and, as a result, is substantially shielded from disturbances. As a result, magnetic field measurements are generally more accurate than non shielded approaches.

Angular information is determined by a control unit based on the magnetic field measurements at block 910. The angular information includes, for example, rotational speed of the shaft, angular position of the shaft, and the like.

While the method and variations thereof are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems/devices shown in FIGS. 1, 2, etc., are non-limiting examples of system that may be used to implement the above methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A sensor arrangement includes a sensor element and a magnet module. The sensor element is configured to measure a magnetic field and is positioned within a shaft. The shaft is configured to shield the magnet module and the sensor element. The magnet module is configured to generate the magnetic field. The sensor element is at least partially positioned within the shaft.

Another sensor arrangement includes a sensor module, a case and a shaft. The sensor module is configured to measure a magnetic field. The case has a module opening and a case recess. The sensor module is positioned within the module opening. The shaft is coupled to the shaft recess and has a magnet module configured to generate the magnetic field. The shaft is configured to shield the magnet module and the sensor module.

An integrated sensor device includes a sensor module, a case and a magnet module. The sensor module is configured to measure a magnetic field. The case has a module opening and a shaft recess and is configured to shield the sensor module. The sensor module is positioned within the module opening. The magnet module is positioned within a shaft. The shaft is coupled to the shaft recess. The magnet module is configured to generate the magnetic field. The shaft is configured to shield the magnet module A sensor system having a sensor module, an interface, and a control unit is disclosed. The sensor module is located within a case and has a sensor element configured to provide measurements of a magnetic field. The case shields the sensor module from one or more disturbances. The interface is coupled to the shielded sensor module and configured to transfer magnetic field measurements from the shielded sensor module. The control unit is configured to determine angular information based on the magnetic field measurements.

A method of operating a sensor device is disclosed. A sensor module is configured or positioned into a case. The sensor module is shielded from one or more disturbances by the case. A shaft is configured to have a shaft recess. A magnet module is positioned within the shaft recess. The magnet module is shielded from the one or more disturbances by the shaft. A magnetic field is generated by the magnet module. The magnetic field is measured by the sensor module.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A sensor arrangement comprising:
   a sensor element located within a sensor module and the sensor element configured to measure a magnetic field,
   a ring shaped magnet positioned about an inner surface of an open portion of a shaft, the ring shaped magnet configured to generate the magnetic field that is measured by the sensor element,
   the shaft being configured to be fully rotated a plurality of times in a direction;
   the sensor module being at least partially positioned within the open portion of the shaft,
   the ring shaped magnet surrounding at least a portion of the sensor element, and
   the shaft being configured to shield the sensor element and the ring shaped magnet from disturbances to the magnetic field.

2. The sensor arrangement of claim 1, further including a centering mechanism within the shaft and configured to center the ring shaped magnet about a shaft rotation axis.

3. The sensor arrangement of claim 1, wherein the shaft is comprised of a soft magnetic material and has a relative permeability greater than one,
   the soft magnetic material, which has the relative permeability greater than one, of the shaft shielding the sensor element and the ring shaped magnet from the disturbances to the magnetic field.

4. The sensor arrangement of claim 1, wherein a case in which the shaft is located provides hermetic seal for the sensor element.

5. The sensor arrangement of claim 4, wherein the case provides one of magnetic shielding or electric shielding for the sensor element.

6. The sensor arrangement of claim 1, further comprising a controller configured to receive at least one of magnetic field measurement information or angle information from the sensor module.

7. The sensor arrangement of claim 1, wherein the sensor module includes connections from leadframes of the sensor element to external ports on the sensor module.

8. The sensor arrangement of claim 1, wherein the shaft is solid.

9. The sensor arrangement of claim 1, wherein the shaft is hollow.

10. A sensor system comprising:
a sensor module having a sensor element configured to provide measurements of a magnetic field,
the magnetic field, for which the sensor element is configured to provide the measurements, being generated by a ring shaped magnet positioned about an inner surface of an open portion of a shaft,
the shaft being configured to be fully rotated a plurality of times in a direction,
the sensor module being at least partially positioned within the open portion of the shaft, and
at least a portion of the sensor element being surrounded by the ring shaped magnet;
an interface coupled to the sensor module and configured to transfer magnetic field measurements from the sensor module; and
a control unit configured to determine angular information based on the magnetic field measurements.

11. The sensor system of claim 10, wherein the sensor element is located at least partially within the shaft and the angular information includes an evaluated angular position for the shaft.

12. A method of operating a sensor device, the method comprising:
configuring a shaft to have a shaft recess and positioning a ring shaped magnet about an inner surface of the shaft recess,
the shaft being configured to be fully rotated a plurality of times in a direction, and
the ring shaped magnet being shielded from one or more disturbances by the shaft;
integrating a sensor element of a sensor module into the shaft recess,
the sensor module being shielded from the one or more disturbances by the shaft recess, and
the ring shaped magnet surrounding at least a portion of the sensor element;
integrating the sensor module into a case and configuring the case to receive the shaft;
generating a magnetic field by the ring shaped magnet, the magnetic field being enforced by the shaft; and
measuring the magnetic field, generated by the ring shaped magnet, by the sensor module, wherein the sensor element is positioned within the shaft.

13. The method of claim 12, further comprising determining a rotational speed of the shaft.

14. The method of claim 12, further comprising determining an angular position of the shaft.

15. The sensor arrangement of claim 1, wherein the sensor module is positioned at an opening of a case in which the shaft is located, and
the sensor module being configured to seal the opening of the case and extend from the case into the open portion of the shaft.

16. The sensor arrangement of claim 15, wherein the case is part of an automotive power train.

17. The sensor arrangement of claim 1, wherein the sensor element is at least partially positioned within the open portion of the shaft.

18. The sensor system of claim 10, wherein the shaft is comprised of a soft magnetic material and has a relative permeability greater than one,
the soft magnetic material, which has the relative permeability greater than one, of the shaft shielding the sensor element and the ring shaped magnet from disturbances to the magnetic field.

19. The sensor system of claim 10, wherein the shaft is configured to shield the sensor element and the ring shaped magnet from disturbances to the magnetic field.

20. The method of claim 12, wherein the shaft is comprised of a soft magnetic material and has a relative permeability greater than one,
the soft magnetic material, which has the relative permeability greater than one, of the shaft shielding the sensor element and the ring shaped magnet from the one or more disturbances to the magnetic field.

21. The sensor arrangement of claim 1, wherein the shaft is configured to be fully rotated the plurality of times in the direction by a motor attached to the end of the shaft.

* * * * *